(12) United States Patent
Karasawa et al.

(10) Patent No.: US 11,798,585 B2
(45) Date of Patent: Oct. 24, 2023

(54) DISK DRIVE SUSPENSION INCLUDING A LOAD BEAM WITH AN ARC-SHAPED TAB, DISK DRIVE, AND DISK DRIVE SUSPENSION MANUFACTURING METHOD

(71) Applicant: NHK SPRING CO., LTD., Yokohama (JP)

(72) Inventors: Takumi Karasawa, Yokohama (JP); Naoki Iwamoto, Yokohama (JP); Sei Kawao, Yokohama (JP); Tomoharu Imai, Yokohama (JP)

(73) Assignee: NHK SPRING CO., LTD., Kanagawa (JP)

( * ) Notice: Subject to any disclaimer, the term of this patent is extended or adjusted under 35 U.S.C. 154(b) by 0 days.

(21) Appl. No.: 17/958,156

(22) Filed: Sep. 30, 2022

(65) Prior Publication Data

US 2023/0108526 A1   Apr. 6, 2023

(30) Foreign Application Priority Data

Oct. 1, 2021 (JP) .................................. 2021-162717

(51) Int. Cl.
*G11B 5/48* (2006.01)
*G06F 3/06* (2006.01)

(52) U.S. Cl.
CPC .......... *G11B 5/4833* (2013.01); *G06F 3/0676* (2013.01); *G11B 5/4826* (2013.01); *G11B 2220/2516* (2013.01)

(58) Field of Classification Search
CPC ............... G11B 5/4833; G11B 5/4826; G11B 2220/2516; G06F 3/0676
See application file for complete search history.

(56) References Cited

U.S. PATENT DOCUMENTS

| 5,864,448 | A | * | 1/1999 | Berberich | G11B 5/54 |
| 6,151,197 | A | * | 11/2000 | Larson | G11B 21/16 |
| 6,157,520 | A | * | 12/2000 | Mangold | G11B 21/22 |
| 6,407,889 | B1 | * | 6/2002 | Khan | G11B 5/6005 |
| 7,085,104 | B1 | * | 8/2006 | Hadian | G11B 5/54 |
| 7,365,945 | B2 | * | 4/2008 | Fujimoto | G11B 5/4833 360/255 |
| 7,724,476 | B1 | * | 5/2010 | Bjorstrom | G11B 5/4833 360/255 |
| 8,976,491 | B1 | * | 3/2015 | Chen | G11B 5/4833 360/245.7 |
| 9,368,138 | B2 | | 6/2016 | Inoue et al. | |
| 9,679,592 | B2 | | 6/2017 | Kawao | |
| 9,761,256 | B2 | | 9/2017 | Kawao | |
| 9,990,945 | B2 | * | 6/2018 | Aoki | G11B 5/102 |

(Continued)

FOREIGN PATENT DOCUMENTS

JP          2020129423 A       8/2020

*Primary Examiner* — Brian E Miller
(74) *Attorney, Agent, or Firm* — Holtz, Holtz & Volek PC (57) ABSTRACT

A disk drive suspension of the embodiments includes a load beam, and a flexure including a mounting portion on which a slider is mounted and overlapping with the load beam. The load beam includes a tab further extending than the mounting portion longitudinal direction of the load beam. The tab is shaped in an arc such that a central portion in a lateral direction protrudes with respect to both end portions in the lateral direction, in the load beam. Each of the both end portions includes a flat surface parallel to the lateral direction.

3 Claims, 6 Drawing Sheets

(56) References Cited

U.S. PATENT DOCUMENTS

| | | | | |
|---|---|---|---|---|
| 2002/0075602 A1* | 6/2002 | Mangold | ............. | G11B 5/4826 |
| 2005/0030671 A1* | 2/2005 | Lee | ..................... | G11B 5/4833 |
| | | | | 360/255 |
| 2005/0174696 A1* | 8/2005 | Choi | ..................... | G11B 5/4833 |
| 2005/0219757 A1* | 10/2005 | Suzuki | ................. | G11B 5/4826 |
| 2007/0076323 A1* | 4/2007 | Deguchi | ............... | G11B 21/12 |
| 2007/0247760 A1* | 10/2007 | Hanya | ................. | G11B 5/4833 |
| | | | | 360/245.5 |
| 2009/0091859 A1* | 4/2009 | Horiuchi | ............. | G11B 5/4826 |
| | | | | 29/603.01 |
| 2009/0251824 A1* | 10/2009 | Heo | ........................ | G11B 5/54 |
| | | | | 360/244 |
| 2009/0268346 A1* | 10/2009 | Heo | ........................ | G11B 5/54 |
| | | | | 360/244.5 |
| 2014/0268426 A1* | 9/2014 | Hardy | ................. | G11B 5/4833 |
| | | | | 360/245.2 |
| 2020/0258540 A1* | 8/2020 | Uehara | ............... | G11B 25/043 |
| 2021/0383829 A1 | 12/2021 | Kurebayashi et al. | | |
| 2023/0088522 A1* | 3/2023 | Kato | ........................ | G11B 5/54 |

* cited by examiner

DISK DRIVE SUSPENSION INCLUDING A LOAD BEAM WITH AN ARC-SHAPED TAB, DISK DRIVE, AND DISK DRIVE SUSPENSION MANUFACTURING METHOD

CROSS-REFERENCE TO RELATED APPLICATIONS

This application is based upon and claims the benefit of priority from prior Japanese Patent Application No. 2021-162717, filed Oct. 1, 2021, the entire contents of which are incorporated herein by reference.

BACKGROUND OF THE INVENTION

1. Field of the Invention

The present invention relates to a disk drive suspension used for hard disk drives or the like, a disk drive and a disk drive suspension manufacturing method.

2. Description of the Related Art

A hard disk drive (HDD) is used in an information processing apparatus such as a personal computer. The hard disk drive includes a magnetic disk which rotates about a spindle, a carriage which turns about a pivot, and the like. The carriage includes an actuator arm, and turns in a disk track width direction about the pivot by a positioning motor such as a voice coil motor.

A disk drive suspension (hereinafter simply referred to as a suspension) is attached to the actuator arm. Toe suspension includes a load beam, a flexure overlapping with the load beam, and the like. A slider which constitutes a magnetic head is provided on a gimbal portion formed near a distal end of the flexure. Elements (transducers) for access such as read or write of the data are provided at the slider. A head gimbal assembly is constituted by the load beam, the flexure, the slider, and the like.

In order to overcome the increase in the recording density of the disks, the head gimbal assembly needs to be further downsized, and the slider needs to be positioned more precisely relative to the recording surface of the disks. Furthermore, since the demand for improvement of recording capacity of the hard disk drive for improvement of recording density is strong, the number of magnetic disks that the hard disk drive comprises has increased (so-called multi-disking).

In order to increase the number of magnetic disks, it is necessary not only to make magnetic disks thinner, but also to make the distance between magnetic disks short. When the interval between the magnetic disks is made shorter, suspensions facing each other between the magnetic disks are more likely to contact each other. For this reason, thinner suspensions are required.

For example, JP 2020-129423 A discloses a disk drive in which the number of magnetic disks installed as recording media can be increased. Even in the suspension provided in the disk drive disclosed in JP 2020-129423 A, however, when the number of magnetic disks is increased, tabs at the distal ends of the suspensions facing each other may contact each other.

BRIEF SUMMARY OF THE INVENTION

An object of the present invention is to provide a disk drive suspension, a disk drive, and a disk drive suspension manufacturing method, capable of corresponding to increase in number of magnetic disks.

According to one embodiment, a disk drive suspension comprises a load beam, and a flexure including a mounting portion on which a slider is mounted and overlapping with the load beam. The load beam includes a tab further extending than the mounting portion in a longitudinal direction of the load beam. The tab is shaped in an arc such that a central portion in a lateral direction protrudes with respect to both end portions in the lateral direction, in the load beam. Each of the both end portions includes a flat surface parallel to the lateral direction.

The tab may have an arc-shaped first surface located on a side of the flexure and an arc-shaped second surface on a side opposite to the first surface, in a thickness direction of the load beam intersecting the longitudinal direction and the lateral direction. Each of the flat surfaces may be connected to the second surface. Each of the both end portions may further have a connecting surface connecting the first surface to the flat surface.

Each of the both end portions may further include a first edge at which the first surface and the connecting surface are connected, and a second edge at which the flat surface and the connecting surface are connected. A distance from the first edge to the second edge in the thickness direction may be less than or equal to a half of a thickness between the first surface and the second surface.

According to another embodiment, a disk drive suspension manufacturing method is a method of manufacturing a disk drive suspension comprising a load beam including a tab. The method comprises a curving a metal plate such that a central portion in a lateral direction protrudes with respect to both end portions in the lateral direction, in the tab, and a flattening surfaces parallel to the lateral direction, on the both end portions.

The metal plate has a third surface formed in an arc shape in the curving, a fourth surface on a side opposite to the third surface, which is formed in an arc shape in the curving, a fifth surface connecting the third surface to the fourth surface, and an edge to which the fourth surface and the fifth surface are connected. The edge may be flatted in the flattening.

According to yet another embodiment, a disk drive comprises a first disk, a second disk spaced apart from and opposed to the first disk, a first suspension performing data read from or data write to the first disk, a second suspension performing data read from of data write to the second disk, and a ramp including an interval and being provided on an outer peripheral side of the first disk and the second disk. Each of the first suspension and the second suspension comprises a load beam, and a flexure including a mounting portion on which a slider is mounted and overlapping with the load beam. The load beam includes a tab further extending than the mounting portion in a longitudinal direction of the load beam. The tab is shaped in an arc such that a central portion in a lateral direction protrudes with respect to both end portions in the lateral direction, in the load beam. Each of the both end portions includes a flat surface parallel to the lateral direction. The first suspension and the second suspension are located in the interval in a state in which the flat surfaces are spaced apart from each other and opposed to each other, when the mounting portion retreats from each of the first and disk and the second disk.

The disk drive suspension, the disk drive, and the disk drive suspension manufacturing method, can correspond to increase in the number of magnetic disks.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
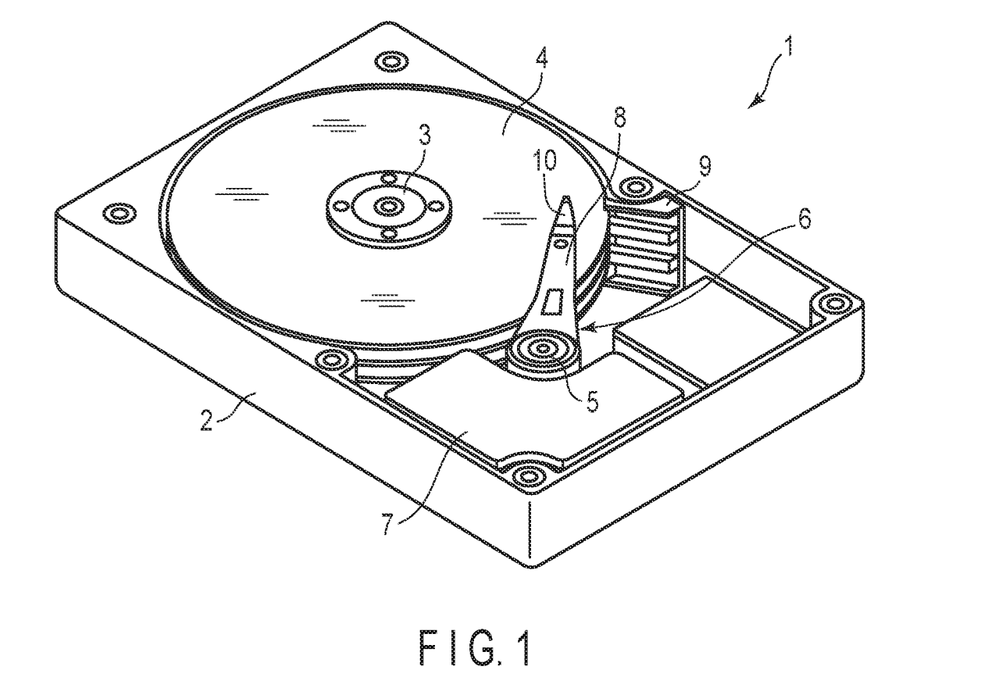
FIG. 1 is a schematic perspective view showing an example of a disk drive.

FIG. 1 is a schematic perspective view showing an example of a disk drive (HDD) 1. The disk drive 1 comprises a casing 2, a plurality of magnetic disks 4 (hereinafter simply referred to as disks 4 rotatable about a spindle 3, a carriage 6 which can turn about a pivot 5, a positioning motor (voice coil motor) 7 for driving the carriage 6, and a ramp 9 provided on the casing 2. The ramp 9 is provided on an outer circumference side of the disks 4. The casing 2 is sealed by a lid (not shown).

Figure 2:
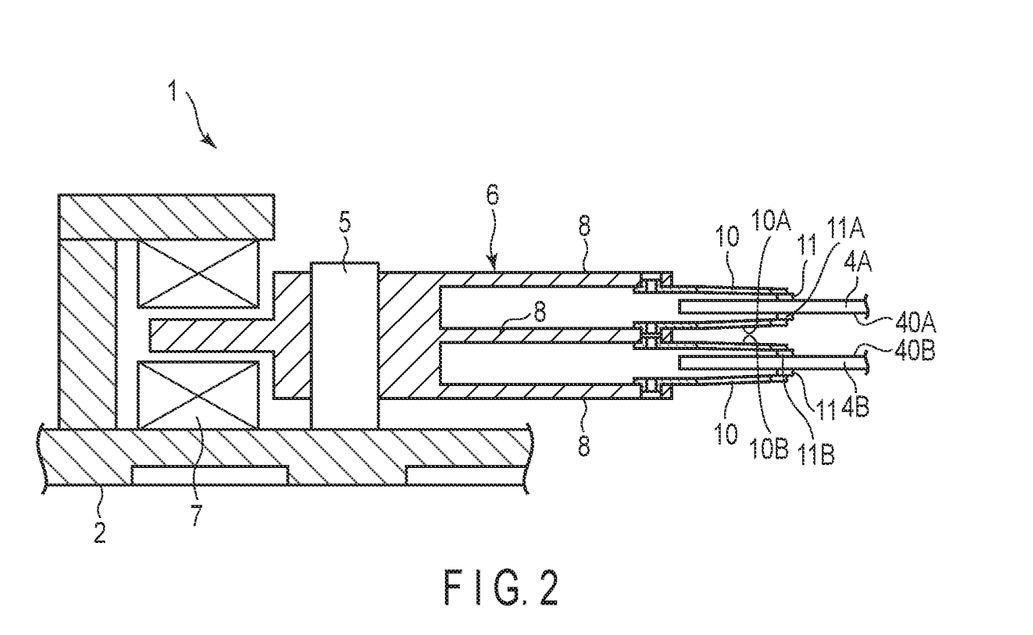
FIG. 2 is a schematic cross-sectional view showing a part of the disk drive.

FIG. 2 is a schematic cross-sectional view showing a part of the disk drive 1. As shown in FIG. 1 and FIG. 2, a plurality of arms (carriage arms) 8 are provided on the carriage 6. A suspension 10 is mounted on a distal end portion of each arm 8. A slider 11, which constitutes the magnetic head, is, provided on the distal end portion of each suspensions 10.

When each disk 4 rotates at a high speed, air flows in between the disk 4 and the slider 11 and an air bearing is thereby formed. When the carriage 6 is turned by the positioning motor 7, the suspension 10 moves radially relative to the disk 4, such that the slider 11 moves to a desired track of the disk 4.

When the disk 4 is stopped, the suspension 10 retreats toward the ramp 9 shown in FIG. 1. When the disk 4 is driven, the suspension 10, which has retreated to the ramp 9, moves from the ramp 9 toward the disk 4.

As shown in FIG. 2, the disks 4 include a first disk 4A and a second disk 4B. The first disk 4A is opposed and spaced apart from the second disk 4B. From the other viewpoint, the first disk 4A faces the second disk 4B in the thickness direction of the casing 2. The first disk 4A has a face 40A and the second disk 4B has a face 40B opposed to the face 40A.

The plurality of suspensions 10 provided at the disk drive 1 includes a first suspension 10A and a second suspension 10B. The first suspension 10A and the second suspension 10B are located between the first disk 4A and the second disk 4B. The first suspension 10A faces the second suspension 10B in the thickness direction of the casing 2.

The first suspension 10A includes a slider 11A that reads data from or writes data to the face 40A side of the first disk 4A. The second suspension 10B includes a slider 11B that reads data from or writes data to the face 40B side of the second disk 4B. The plurality of disks 4 are not limited to two disks, but may be three or more disks. The quantity of suspensions 10 is changed arbitrarily in accordance with the number of disks 4.

Figure 3:
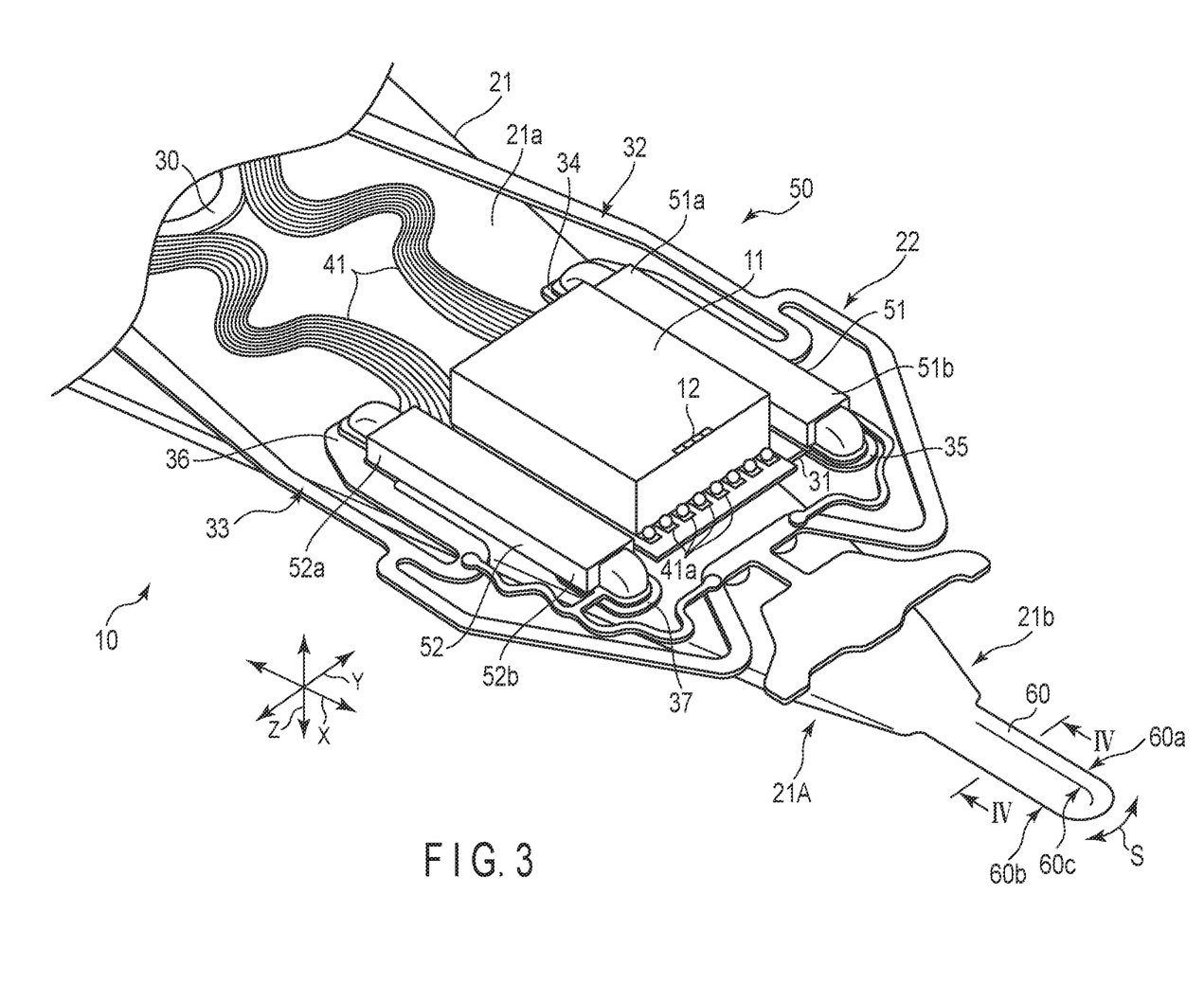
FIG. 3 is a schematic perspective view showing a part of a distal side of a suspension as seen from a slider side.

FIG. 3 is a schematic perspective view showing a part of a distal side of the suspension 10 as seen from the slider 11 side. The suspension 10 comprises a base plate (not shown) fixed to the arm 8 of the carriage 6 (shown in FIG. 1 and FIG. 2), a load beam 21, and a flexure 22 overlapping with the load beam 21. The flexure 22 is arranged along the load beam 21. The flexure 22 is secured to the load beam 21 by laser spot welding or other means.

Both the load beam 21 and the flexure 22 extend in the longitudinal direction of the suspension 10. In the following descriptions, the longitudinal direction of the suspension 10, the load beam 21 and the flexure 22 is referred to as a longitudinal direction X, and a direction (width direction) orthogonal to the longitudinal direction X is referred to as a lateral direction Y of the suspension 10, the load beam 21, the flexure 22, and the like.

A direction intersecting (for example, orthogonal to) the longitudinal direction X and the lateral direction Y is referred to as a thickness direction of the suspension 10, the load beam 21, the flexure 22, and the like. In addition, a sway direction S is defined as indicated by an arc-shaped arrow near the distal end of the load beam 21.

For example, elements 12 that can convert magnetic signals and electrical signals, such as MR elements, are provided at the distal end portion of the slider 11 constituting the magnetic head. Access such as data write, data read, or the like on the disks 4 is performed by the elements 12. A head gimbal assembly is composed of the slider 11, the load beam 21, the flexure 22, and the like.

The load beam 21 has a face 21a. The flexure 22 is arranged on the face 21a. The flexure 22 overlaps with a body 21A of the load beam 21. The flexure 22 includes a metal base 30 formed of a thin stainless steel plate and a wiring portion 41 arranged along the metal base 30. A part of the wiring portion 41 is electrically connected to the elements 12 of the slider 11 via a terminal 41a for the slider 11.

The thickness of the metal base 30 is smaller than the thickness of the load beam 21. The thickness of the metal base 30 is desirably from 12 to 25 µm, for example, 20 µm. The thickness of the load beam 21 is, for example, 30 µm.

The flexure 22 includes a tongue 31, a first outrigger 32, and a second outrigger 33. The slider 11 is mounted on the tongue 31. The tongue 31 is an example of a mounting portion on which the slider 11 is mounted.

The first outrigger 32 and the second outrigger 33 are arranged on both sides of the tongue 31 in the lateral direction Y. The first outrigger 32 and the second outrigger 33 are shaped to expand to both sides of the tongue 31 in the lateral direction Y. Each of the tongue 31, the first outrigger 32, and the second outrigger 33 is a part of the metal base 30 and, for example, its outline is formed by etching.

A dimple (not shown) protruding toward the tongue 31 is formed near the distal end of the body 21A of the load beam 21. The distal end of the dimple is in contact with the tongue 31. The tongue 31 can pivot about the distal end of the dimple to make a desired gimbal motion. A gimbal portion 50 is composed of the tongue 31, the first outrigger 32, the second outrigger 33, the dimple, and the like.

A first micro actuator element 51 and a second micro actuator element 52 are mounted on the gimbal portion 50. The micro actuator elements 51 and 52 have a function of rotating the tongue 31 in the sway direction S.

The micro actuator elements 51 and 52 are arranged on both sides of the slider 11 in the lateral direction Y. The micro actuator elements 51 and 52 are formed of a piezoelectric material such as lead zirconate titanate (PZT) or the like.

Both ends 51a and 51b of the first micro actuator element 51 are fixed to actuator support portions 34 and 35 of the tongue 31, respectively, by a conductive adhesive or the like. Both ends 52a and 52b of the second micro actuator element 52 are fixed to actuator support portions 36 and 37 of the tongue 31, respectively, by a conductive adhesive or the like.

The body 21A of the load beam 21 includes a distal end portion 21b which is located on a side opposite to one end connected to the baseplate. A tab 60 extending from the distal end portion 21b in the longitudinal direction X is formed on the load beam 21. When the disks 4 are stopped, the tab 60 are guided such that the suspension 10 moves to a retreating position.

The tab 60 is formed integrally with the body 21A of the load beam 21. As shown in FIG. 3, the tab 60 has an elongated shape extending in the longitudinal direction X. The tab 60 further extends than the tongue 31 in the longitudinal direction X.

The tab 60 includes an end portion 60a, an end portion 60b on a side opposite to the end portion 60a, a central portion 60c in the lateral direction Y. The central portion 60c is located between the end portion 60a and the end portion 60b in the lateral direction Y. The end portion 60a and the end portion 60b may be hereinafter referred to as "both end portions 60a and 60b".

Figure 4:
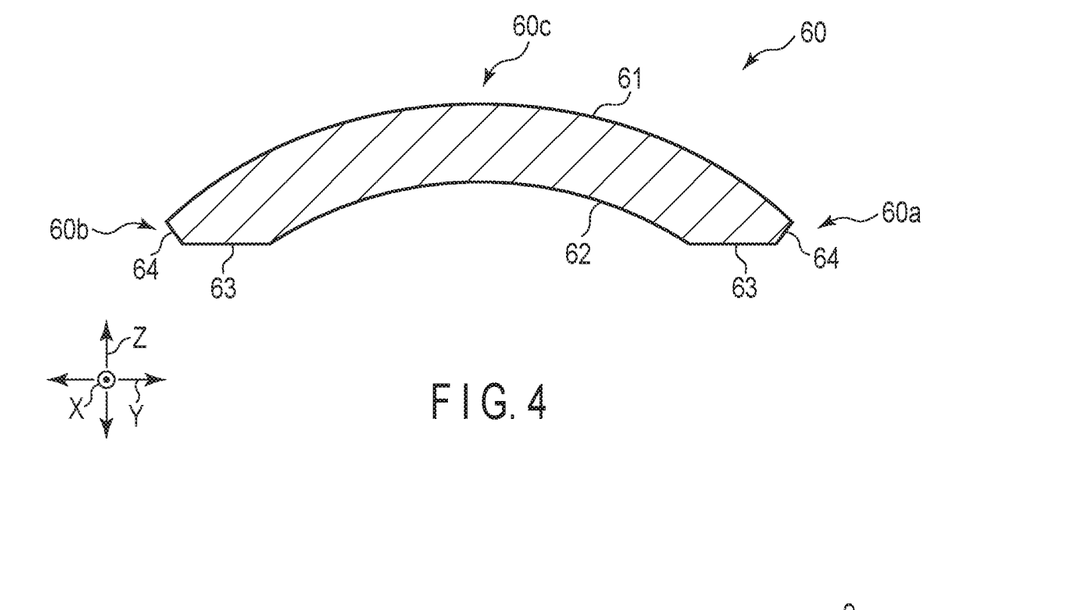
FIG. 4 is a cross-sectional view showing a tab taken along line IV-IV of FIG. 3.

FIG. 4 is a cross-sectional view showing the tab 60 as taken along line IV-IV of FIG. 3. The tab 60 is formed in a shape of an arc curved toward the flexure 22 side in the thickness direction Z. The tab 60 "curved toward the flexure 22 side" means that the tab 60 is curved to protrude in a direction (upward direction in FIG. 4) from a face opposite to the face 21a of the load beam 21 toward the face 21a, in the thickness direction Z. More specifically, as shown in FIG. 4, the tab 60 has a curved shape such that the central portion 60c further protrudes than the both ends 60a and 60b.

The tab 60 has an arc-shaped surface 61 (first surface), and an arc-shaped surface 62 (second surface) on a side opposite to the surface 61. Each of the end portions 60a and 60b has a flat surface 63 connected to the surface 61 and a connecting surface 64 connecting the surface 61 with the flat surface 63. The surface 61 is located on the flexure 22 side (i.e., the same side as the face 21a of the body 21A of the load beam 21) in the thickness direction Z. The tab 60 is curved from the surface 62 to the surface 61 in the thickness direction Z. The centers of curvature of the surfaces 61 and 62 are located on the surface 62 side in the thickness direction Z.

The flat surfaces 63 are formed at both ends 60a and 60b of the tab 60 along the longitudinal direction X. For example, the flat surface 63 is formed entirely from a proximal end to a distal end of the tab 60 connected to the body 21A. As shown in FIG. 4, the flat surface 63 is a surface parallel to the lateral direction Y. In this case, "parallel to the lateral direction Y" also implies being slightly inclined with respect to the lateral direction Y. Furthermore, the flat surfaces 63 may be surfaces parallel to the longitudinal direction X.

A distance between the flat surface 63 and the surface 61 in the thickness direction Z at the both ends 60a and 60b is shorter at a position moving away from the central portion 60c in the lateral direction Y. The connecting surfaces 64 are formed at the both ends 60a and 60b of the tab 60 along the longitudinal direction X. In the example shown in FIG. 4, the connecting surface 64 is a surface inclined with respect to the flat surface 63. From the other viewpoint, the flat surface 63 is connected to the surface 61 via the connecting surface 64.

Figure 5:
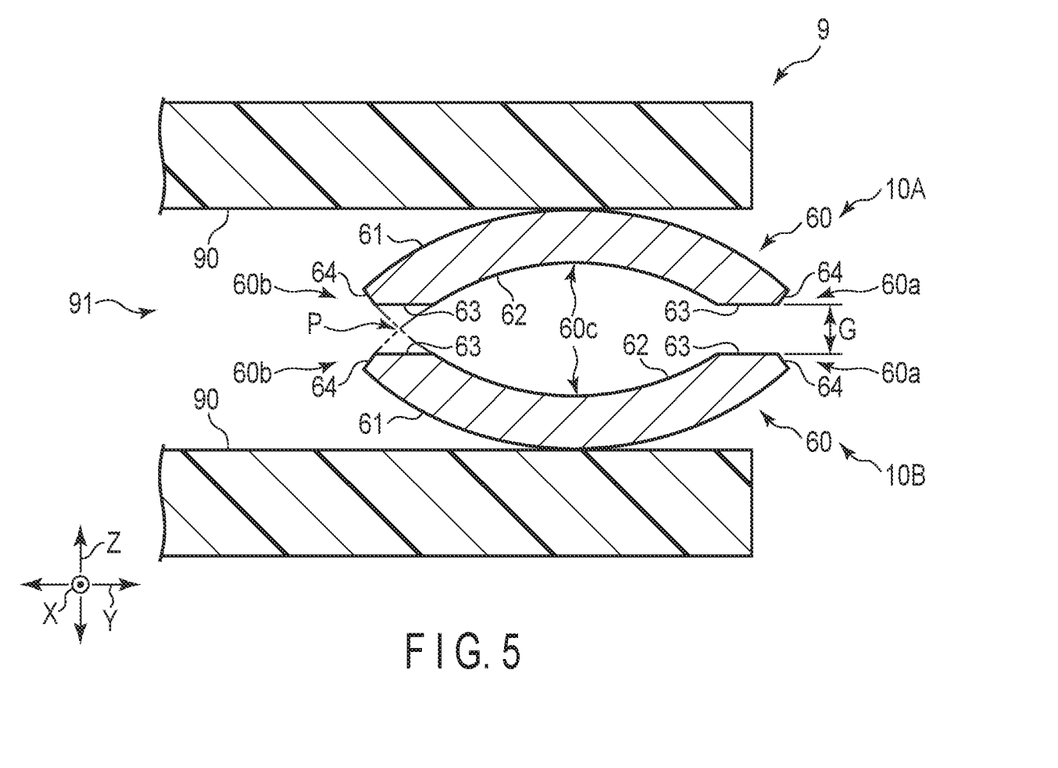
FIG. 5 is a view showing a relationship between the tab and the ramp when the suspension is retracted into the ramp.

FIG. 5 is a view showing a relationship between the tab 60 and the ramp 9 when the suspension 10 retreats into the ramp 9. FIG. 5 shows a part of a cross section of the tab 60 and the ramp 9 as seen from the distal end side of the tab 60. FIG. 5 shows, for example, a state in which the tongue 31 on which the slider 11 is mounted retreats from each of the first disk 4A, and the second disk 4B.

In the example shown in FIG. 5, the ramp 9 has two support surfaces 90 and a gap 91 formed between the two support surfaces 90. The ramp 9 is formed of, for example, a synthetic resin. The tab 60 of the first suspension 10A and the tab 60 of the second suspension 10B are each located in the gap 91.

The tabs 60 are supported on the support surfaces 90, respectively, in the gap 91. The surfaces 61 are in contact with the support surfaces 90, respectively, at the central portions 60c of the tabs 60. The surface 62 and the flat surfaces 63 of the first suspension 10A are spaced apart and opposed to the face surface 62 and the flat surfaces 63 of the second suspension 10B in the thickness direction Z. In this case, the flat surfaces 63 are closest to each other.

As shown in FIG. 5, the flat surfaces 63 are parallel to each other. A gap G is formed between the flat surfaces 63. From the other viewpoint, the flat surfaces 63 of the first suspension 10A are not in contact with the flat surfaces 63 of the second suspension 10B.

Shapes of the ends 60b of the tabs 60 of the suspensions 10A and 10B in a case where the flat surfaces 63 and the connecting surfaces 64 are not formed are represented by broken lines. When the flat surfaces 63 are not formed, for example, the tabs 60 may contact each other at a position indicated by an arrow P in FIG. 5.

Figure 6:
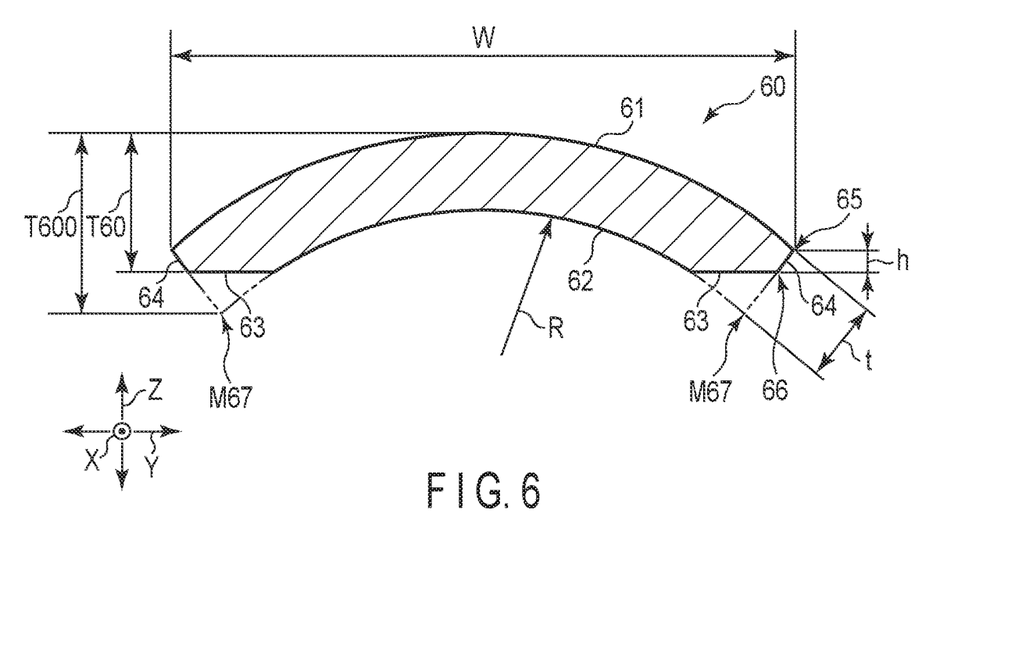
FIG. 6 is a view showing an example of a thickness of the tab in the thickness direction.

FIG. 6 is a view showing an example of a thickness T60 of the tab 60 in the thickness direction Z. As shown in FIG. 6, the end portions 60a and 60b further include an edge 65 (first edge) at which the surface 61 and the connecting surface 64 are connected, and an edge 66 (second edge) at which the flat surface 63 and the connecting surface 64 are connected.

As represented by a broken line in FIG. 6, an intersection at which extensions of the surface 62 and the connecting surface 64 cross is referred to as edge M67. In a case where the flat surface 63 is not formed, the tab 60 has the edge M67. The edge M67 is in contact with a position indicated by the arrow P in FIG. 5.

A distance from the edge 65 to the edge 66 in the thickness direction Z is referred to as a distance h. The distance h can also be referred to as a protrusion height of the edge 66 relative to the edge 65. A thickness between the surfaces 61 and 62 is referred to as a thickness t. A distance between the edges 65 of the end portions 60a and 60b in the lateral direction Y is referred to as a distance W, and a radius of curvature of the surface 62 is referred to as a radius of curvature R. The distance h is desirably, for example, less than or equal to a half of the thickness t (t/2≥1).

By setting the distance h as described above, as shown in FIG. 6, a thickness T60 of the tab 60 in the thickness direction Z can be made smaller than a thickness T600 of the tab 60 in a case where the flat surfaces 63 are not formed. Furthermore, the length of the flat surface 63 in the lateral direction Y can be increased by reducing the thickness T60 of the tab 60 in the thickness direction Z. By increasing the length of the flat surface 63 in the lateral direction Y, the area of the flat surface 63 in the longitudinal direction X and the lateral direction Y can be increased.

Figure 7:
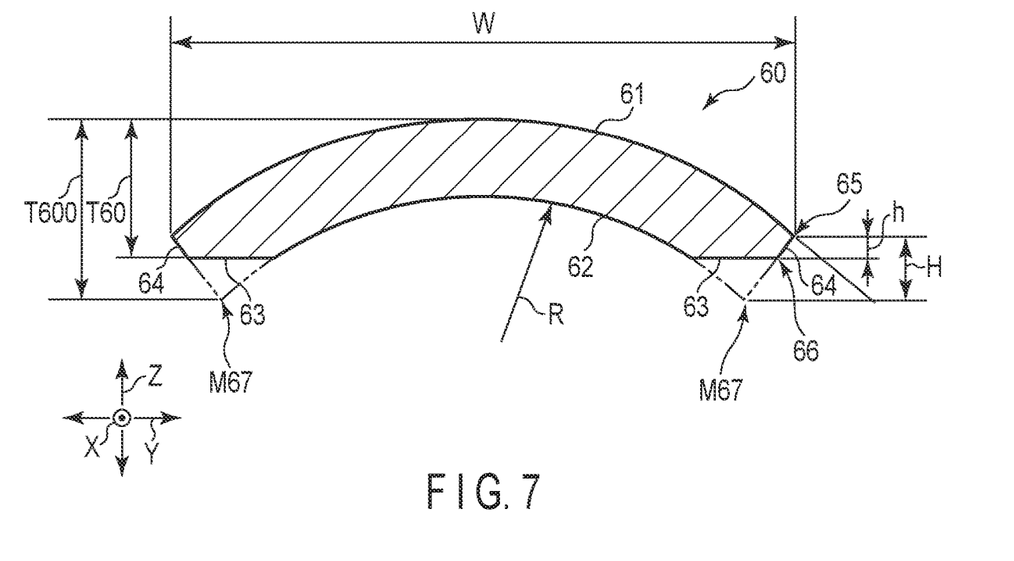
FIG. 7 is a view showing another example of the thickness of the tab in the thickness direction.

FIG. 7 is a view showing another example of the thickness T60 of the tab 60 in the thickness direction Z. A distance H from the edge 65 to the edge M67 in the thickness direction Z is referred to as a distance H. The distance h is desirably, for example, less than or equal to a half of the distance H (H/2≥h).

By making the distance h less than or equal to a half of the distance H, the thickness T60 of the tab 60 can be further reduced. Furthermore, by reducing the thickness T60 of the tab 60 in the thickness direction Z, the length of the flat surface 63 in the lateral direction Y can be made longer.

In the examples shown in FIG. 6 and FIG. 7, for example, the thickness t is 0.030 mm, the distance W is 0.250 mm, the radius of curvature R is 0.160 mm, the distance H is 0.023 mm, and the distance h is 0.008 mm. Each dimension is not limited to the above examples.

Next, a method of manufacturing the suspension 10 comprising the load beam 21 including the tab 60 will be described. An outline of the metal plate in a flat state, which is the material of the load beam 21, is trimmed to a predetermined shape in advance. The load beam 21 can be molded from the metal plate by pressing the metal plate trimmed using a die set.

The tab 60 of the load beam 21 is formed into a curved shape, for example, by coining using a die set. A method of manufacturing the tab 60, of the method of manufacturing the suspension 10, will be mainly described below.

Figure 8:
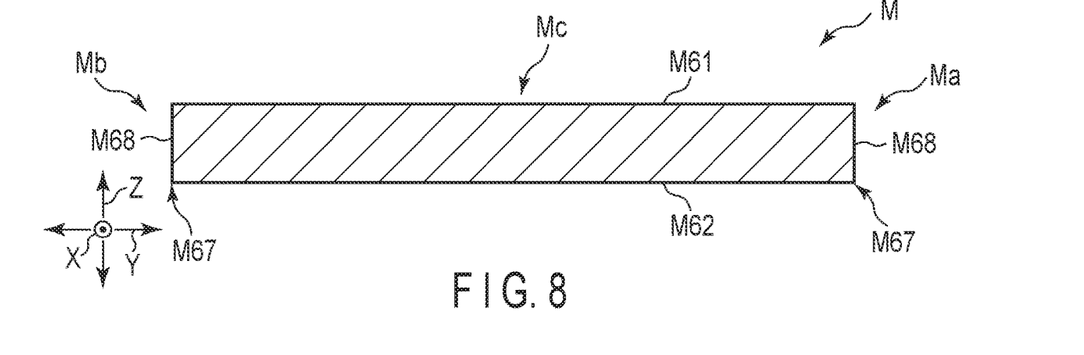
FIG. 8 is a view showing an example of a method of manufacturing a tab.
Figure 9:
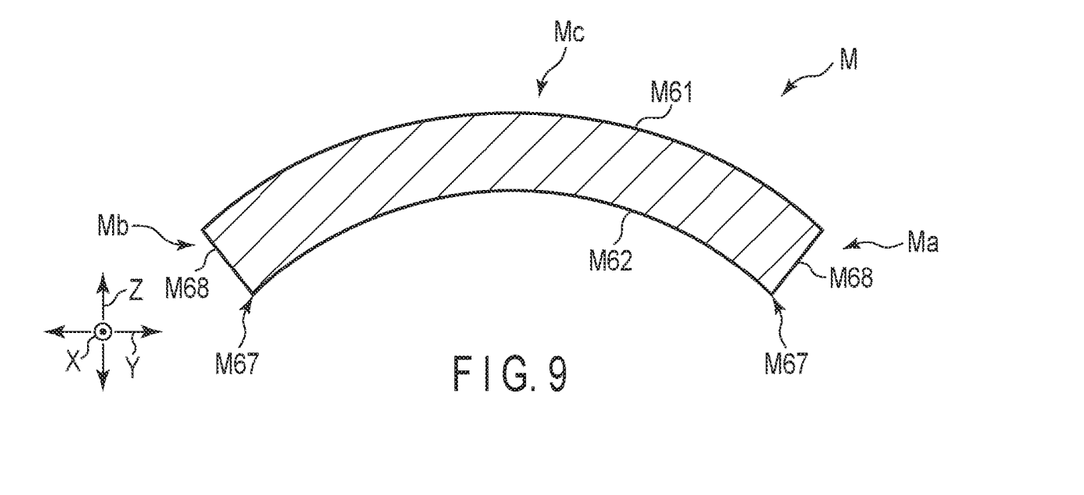
FIG. 9 is a view showing an example of a method of manufacturing a tab.
Figure 10:
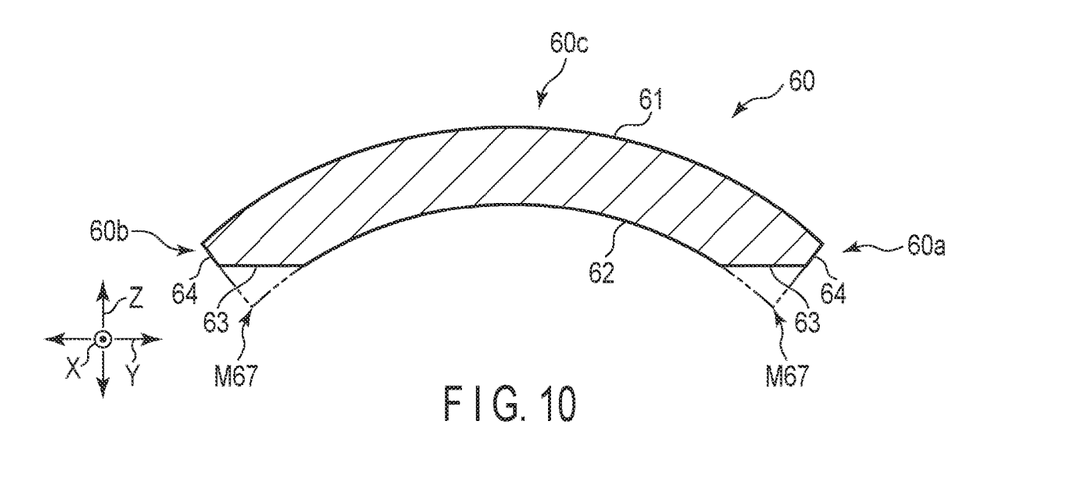
FIG. 10 is a view showing an example of a method of manufacturing a tab.

FIG. 8 to FIG. 10 are views showing an example of the method of manufacturing the tab 60. In FIG. 8 and the following figures, a cross-section of a portion of a metal plate M where the tab 60 is formed is shown. The longitudinal direction, the lateral direction, and the thickness direction of the metal plate M correspond to the longitudinal direction X, the lateral direction Y, and the thickness direction Z of the load beam 21. The thickness t described with reference to FIG. 6 corresponds to the thickness of the metal plate M.

As shown in FIG. 8, the metal plate M has a surface M61, which is the surface 61, a surface M62, which is the surface 62, surfaces M68 (third surfaces), which connect the surface M61 with the surface M62, and edges M67 to which the surface M62 and the surface M68 are connected. The edges M67 correspond to the edges M67 described with reference to FIG. 6 and FIG. 7.

The metal plate M includes an end portion Ma, an end portion Mb on a side opposite to the end portion Ma, and a central portion Mc in the lateral direction Y. The central portion Mc is located between the end portion Ma and the end portion Mb in the lateral direction Y. The end portion Ma and the end portion Mb may be hereinafter referred to as "both end portions Ma and Mb". The end portion Ma corresponds to the end portion 60a, the end portion Mb corresponds to the end portion 60b, and the central portion Mc corresponds to the central portion 60c.

The method of manufacturing the tab 60 includes a curving process and a flattening process. In the curving process, for example, the metal plate M is formed into an arc shape by coining the metal plate M using a die set. As shown in FIG. 9, the metal plate M is curved by the curving process such that the central portion Mc protrudes with respect to the both end portions Ma and Mb.

In the flattening process, for example, the edges M67 are crushed and flattened by pressing the edges M67 toward the surface M61 in the thickness direction Z, using a die set, and the flat surfaces 63 are thereby formed as shown in FIG. 10. Crushing a part of the metal plate M is hereinafter referred to as "crushing process". At the both end portions Ma and Mb, for example, the crushing process of the edges M67 is performed simultaneously. The flat surfaces 63 are formed to have, for example, a predetermined surface property.

The flat surfaces 63 are formed along the longitudinal direction X at the both end portions Ma and Mb of the metal plate M. As shown in FIG. 10, the edges M67 are crushed such that the flat surfaces 63 are parallel to the lateral direction Y. Furthermore, the flat surfaces 63 may be surfaces parallel to the longitudinal direction X.

When the flat surfaces 63 are formed, the connecting surfaces 64 are also formed. The connecting surfaces 64 are parts of the surfaces M68. In the flattening process, the edges M67 are crushed such that the connecting surfaces 64 are formed. The connecting surfaces 64 are, for example, surfaces inclined with respect to the flat surfaces 63.

The tab 60 is formed from the metal plate M by the above-described manufacturing method. The flattening process may be performed before the curving process, after the curving process, or simultaneously with the curving process. After that, the flexure 22 is made to overlap with a predetermined position along the load beam 21.

Figure 11:
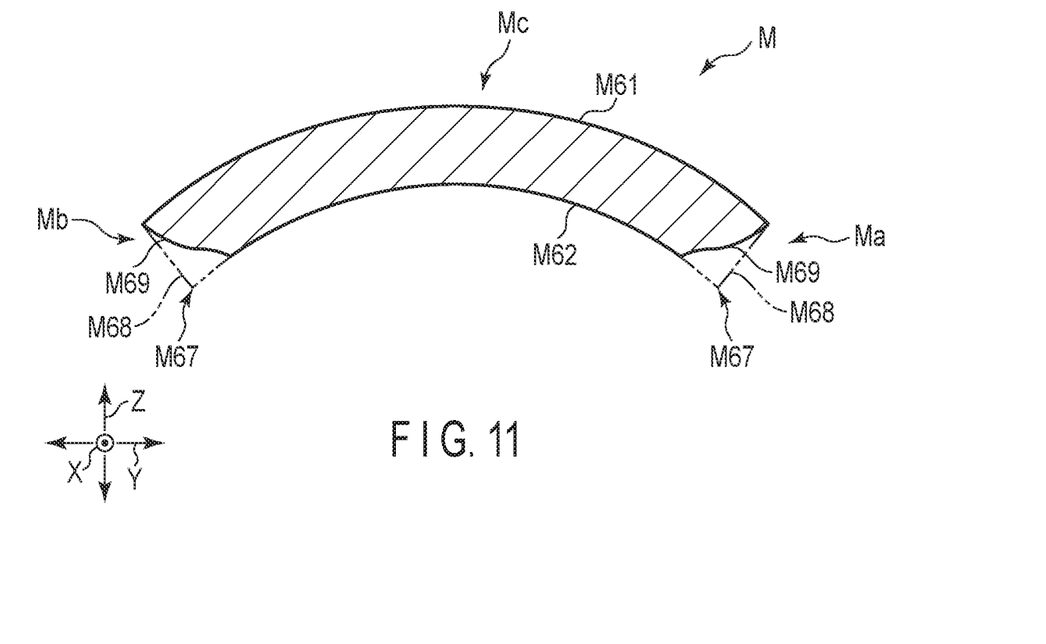
FIG. 11 is a view showing another example of the method of manufacturing the tab.
Figure 12:
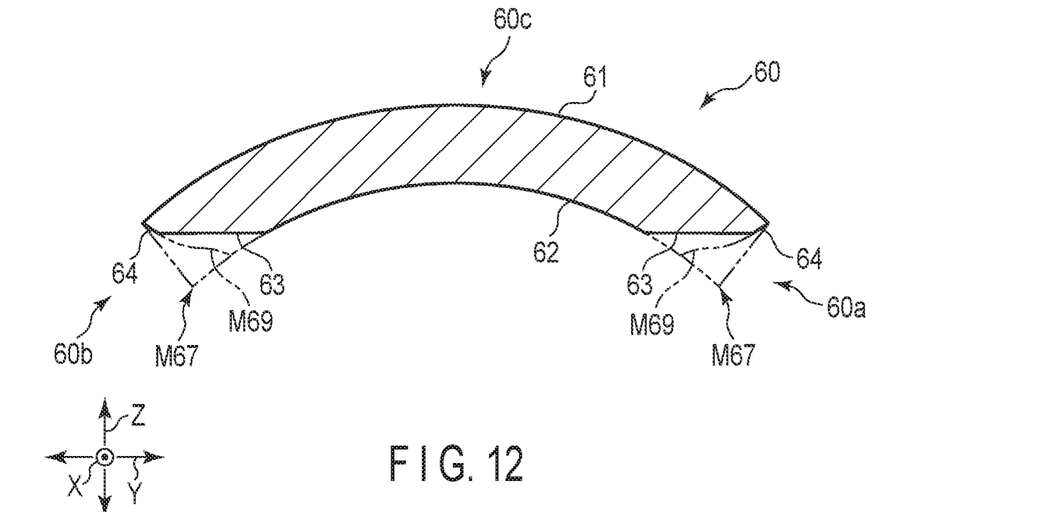
FIG. 12 is a view showing another example of the method of manufacturing the tab.

FIG. 11 and FIG. 12 are views showing another example of the method of manufacturing the tab 60.

For example, the edges M67 and the surfaces M62 and M68 near the edges M67 are inclined by an etching process, prior to the curving process. From the other viewpoint, the edges M67 are dropped by the etching process. For example, the etching process is performed when the metal plate is trimmed by etching to a predetermined outline of the load beam 21.

Surfaces M69 to connect the surfaces M61 and M62 are formed on the metal plate M by the etching process. For example, the surfaces M69 have curved surfaces. The etching process is included in a part of the flattening process.

In the curving process, the metal plate M having the surfaces M69 is formed in an arc shape, as shown in FIG. 11. In the flattening process, for example, parts of the surfaces M69 are crushed and flattened by pressing the surfaces M69 using a die set, and the flat surfaces 63 are thereby formed as shown in FIG. 12.

At the both end portions Ma and Mb, for example, the crushing process of the surfaces M69 is performed simultaneously. The flat surfaces 63 are formed to have, for example, a smoother surface property than the surfaces M69. As shown in FIG. 12, the surfaces M69 are crushed such that the flat surfaces 63 are parallel to the lateral direction Y. Furthermore, the flat surfaces 63 may be surfaces parallel to the longitudinal direction X.

When the flat surfaces 63 are formed, the connecting surfaces 64 are also formed. The connecting surfaces 64 are parts of the surfaces M69. In the flattening process, the surfaces M69 are crushed such that the connecting surfaces 64 are formed. The surfaces M69 may be formed by performing the etching process after the curving process. As described with reference to FIG. 8 to FIG. 10, the crushing process of the surfaces M69 may be performed before the curving process, after the curving process, or simultaneously with the curving process.

The tab 60 of the load beam 21 in the suspension 10 configured as described above has the flat surfaces 63. The thickness T60 of the tab 60 in the thickness direction Z is smaller than the thickness T600 of the tab 60 in a case where the flat surfaces 63 are not formed. Thus, the tabs 60 can hardly be brought into contact with each other, and the distance between the disks 4 and the distance between the support surfaces 90 of the ramp 9 can be made shorter. From the other viewpoint, the tabs 60 are less likely to contact each other even when the interval is smaller than before.

For example, more disks 4 can be provided for the same casing 2 by reducing the interval between the disks 4. Thus, the suspension 10 of the embodiments can accommodate an increase in the number of disks.

The flat surfaces 63 of the tab 60 are connected to the surfaces 62, respectively, at the both end portions 60a and 60b. As a result, when the suspension 10 retreats to the ramp 9, the flat surfaces 63 of the tabs 60 can be spaced apart and opposed in the gap 91 of the ramp 9.

For example, when the tabs 60 do not have flat surfaces 63 as represented by broken lines in FIG. 5, the both end portions 60a and 60b may contact each other the gap 91. When the tabs 60 have the flat surfaces 63, the flat surfaces 63 can be spaced apart and opposed to each other even in the cap between the support surfaces 90 in which the both end portions 60a and 60b (in particular, edges M67) are in contact with each other. From the other viewpoint, the interval between the support surfaces 90 can be made further smaller.

For example, when the disk drive 1 receives an external shock, the tabs 60 of the suspension 10 may contact each other. When the tabs 60 have the flat surfaces 63, the flat surfaces 63 contact each other. When the flat surfaces 63 contact each other, particles such as dust are less likely to be generated at the contact as compared with a case where, for example, the edges M67 contact each other.

As a result, damage to the disk 4 caused by particles can be suppressed and occurrence of access failures such as data read from or data write to the disks 4 by means of the slider 11 can be prevented.

Since the flat surfaces 63 are the surfaces parallel to the lateral direction Y, the flat surfaces 63 are parallel to each other as shown in FIG. 5. For this reason, the flat surfaces 63 are easily brought into surface contact with each other, and particles are less likely to be generated. From the other viewpoint, the edges of the tabs 60 are less like likely to contact each other.

The tab 60 has the connecting surface 64 that connects the flat surface 63 to the surface 61. For this reason, the edge 65 is less likely to be a sharp edge the edge formed in a case where the flat surface 63 and surface 61 are connected directly to each other.

For example, the thickness T60 of the tab 60 can be made smaller by making the distance h less than or equal to a half of the thickness t. If the thickness T60 of the tab 60 becomes smaller, the interval between the disks 4 and the interval between the support surfaces 90 of the ramp 9 can be made further smaller. For example, if the interval between the disks 4 can be reduced, a further increase in the number of disks can be accommodated.

According to the method of manufacturing the suspension 10 of the embodiments configured as described above, the tab 60 having the flat surfaces 63 can be obtained. More specifically, the flat surface 63 parallel to the lateral direction Y can be formed at the both end portions 60a and 60b of the tab 60, by the flattening process.

Since the flat surfaces 63 are formed by the crushing process using a die set, the flat surfaces 63 with higher dimensional accuracy can be obtained on the tab 60 as compared with chemical etching. For this reason, when the tab 60 is located in the gap 91 of the ramp 9, the interval (clearance) between the flat surfaces 63 can be sufficiently secured.

Furthermore, when the flat surfaces 63 contact, generation of particles can be further suppressed by forming the flat surfaces 63 with the smooth surface properties. By performing the flattening process simultaneously with the curving process, the flat surfaces 63 can be formed on the tab 60 without increasing the manufacturing process. When the flattening process is performed before the curving process, the edges M67 can be crushed by the die set against the metal plate M in a flat state, and the flat surfaces 63 can be thereby easily formed.

In the flattening process, the flat surfaces 63 may be formed by crushing the edges M67 of the metal plate M in the crushing process or the flat surfaces 63 may be formed by forming the surfaces M69 in the etching process and then performing the crushing process.

The thickness T60 of the tab 60 can be made smaller by forming the surfaces M69 in the etching process and then crushing the surfaces M69. By forming the surfaces M69 by the etching process, the amount of crushing of the metal plate M in the crushing process of the metal plate M is smaller than that in the crushing process in a case where the surfaces M69 are not formed.

The burden on the die set can be suppressed by reducing the amount of crushing of the metal plate M by the die set. As a result, an interval for maintenance of the die set can be made wider and the burden on the operator can be reduced.

According to the disk drive 1 comprising the suspension 10 of the embodiments, the disk drive 1 with an increased number of disks 4 can be obtained since the thickness T60 of the suspension 10 is small. In addition to the above, various suitable advantages can be obtained in the embodiments.

According to the embodiments, the suspension 10 that can accommodate an increase in the number of disks 4, the disk drive 1 comprising the suspension 10, and the method of manufacturing the suspension 10 can be provided.

In implementing the inventions disclosed in the above embodiments, the specific configuration of each element constituting the suspension for the disc drive, including the specific configuration such as shapes of the load beam and flexure, can be modified in various manners. The connecting surface 64 may be, for example, a curved surface connecting the flat surface 63 to the surface 61.

In the flattening process in the method of manufacturing the tab 60, for example, the flat surfaces 63 may be formed by dropping the edges M67 by laser light. As another example in the flattening process, the flat surfaces 63 may be formed by flattening parts of the surfaces M69 formed by the etching process shown in FIG. 11 by laser light. The laser irradiation may be performed before or after the curving process. The flat surfaces 63 that are less likely to generate particles can be formed by forming the flat surfaces 63 by laser light.

Additional advantages and modifications will readily occur to those skilled in the art. Therefore, the invention is its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive suspension comprising:
   a load beam; and
   a flexure including a mounting portion on which a slider is mounted, and overlapping with the load beam,
   wherein:
   the load beam includes a tab extending further than the mounting portion in a longitudinal direction of the load beam,
   the tab is shaped in an arc such that a central portion in a lateral direction protrudes with respect to both end portions in the lateral direction,
   the tab has an arc-shaped first surface located on a side of the flexure and an arc-shaped second surface on a side opposite to the first surface, in a thickness direction of the load beam intersecting the longitudinal direction and the lateral direction,
   each of the end portions of the tab includes:
     a flat surface parallel to the lateral direction and connected to the second surface,
     a connecting surface connecting the first surface to the flat surface,
     a first edge at which the first surface and the connecting surface are connected, and
     a second edge at which the flat surface and the connecting surface are connected, and
   a distance from the first edge to the second edge in the thickness direction is less than or equal to a half of a thickness between the first surface and the second surface.

2. A method of manufacturing a disk drive suspension comprising a load beam including a tab, the method comprising:
   curving a metal plate such that a central portion in a lateral direction protrudes with respect to both end portions in the lateral direction, in the tab; and
   flattening surfaces parallel to the lateral direction, on the end portions,
   wherein the metal plate has a first surface formed in an arc shape in the curving, a second surface on a side opposite to the first surface, which is formed in an arc shape in the curving, third surfaces connecting the first surface to the second surface, and edges to which the second surface and the third surfaces are connected, and
   wherein the edges are flattened in the flattening.

3. A disk drive comprising:
   a first disk;
   a second disk spaced apart from and opposed to the first disk;
   a first suspension to perform data read from or data write to the first disk;
   a second suspension to perform data read from or data write to the second disk; and
   a ramp including a gap and being provided on an outer peripheral side of the first disk and the second disk,
   wherein:
   each of the first suspension and the second suspension comprises a load beam and a flexure including a mounting portion on which a slider is mounted and overlapping with the load beam,
   the load beam includes a tab extending further than the mounting portion in a longitudinal direction of the load beam,
   the tab is shaped in an arc such that a central portion in a lateral direction protrudes with respect to both end portions in the lateral direction,
   the tab has an arc-shaped first surface located on a side of the flexure and an arc-shaped second surface on a side opposite to the first surface, in a thickness direction of the load beam intersecting the longitudinal direction and the lateral direction,
   each of the end portions of the tab includes:
     a flat surface parallel to the lateral direction and connected to the second surface,
     a connecting surface connecting the first surface to the flat surface,
     a first edge at which the first surface and the connecting surface are connected, and
     a second edge at which the flat surface and the connecting surface are connected, and
   a distance from the first edge to the second edge in the thickness direction is less than or equal to a half of a thickness between the first surface and the second surface, and
   the first suspension and the second suspension are located in the gap of the ramp in a state in which the flat surfaces of the end portions of the tabs thereof are spaced apart from each other and opposed to each other, when the mounting portion of the flexure of the first suspension and the mounting portion of the flexure of the second suspension retreat from each of the first disk and the second disk.

* * * * *